United States Patent [19]

Cruse et al.

[11] Patent Number: 4,787,821
[45] Date of Patent: Nov. 29, 1988

[54] DUAL ALLOY ROTOR

[75] Inventors: Louis D. Cruse, Scottsdale; E. Scott Wright, Mesa, both of Ariz.

[73] Assignee: Allied Signal Inc., Morris, N.J.

[21] Appl. No.: 36,616

[22] Filed: Apr. 10, 1987

[51] Int. Cl.$^4$ .............................................. B63H 1/16
[52] U.S. Cl. ................................ 416/185; 416/213 R; 416/241 R
[58] Field of Search ............... 416/185, 213 R, 223 A, 416/241 A, 241 B, 241 R; 29/156.8 CF, 156.8 R, 156.8 D, 156.8 H; 60/726; 415/203, 204, 205, 206; 403/270, 271, 272, 404

[56] References Cited

U.S. PATENT DOCUMENTS

| | | | |
|---|---|---|---|
| 2,757,901 | 8/1956 | McVeigh | 416/244 R |
| 3,765,796 | 10/1973 | Stargardter et al. | 416/244 R |
| 3,778,188 | 12/1973 | Aspinwall | 416/97 |
| 3,787,141 | 1/1974 | Walsh | 416/244 R |
| 3,824,036 | 7/1974 | Penny et al. | 416/95 |
| 3,847,506 | 11/1974 | Straniti | 416/244 R |
| 3,973,875 | 8/1976 | Bird | 416/241 B |
| 4,051,585 | 10/1977 | Walker et al. | 29/156.8 R |
| 4,096,615 | 6/1978 | Cross | 29/156.8 R |
| 4,097,194 | 6/1978 | Barack et al. | 416/244 A |
| 4,102,603 | 7/1978 | Smith et al. | 416/244 A |
| 4,125,344 | 11/1978 | Tiefenbacher | 416/183 |
| 4,152,816 | 5/1979 | Ewing et al. | 29/156.8 R |
| 4,183,719 | 1/1980 | Bozung | 416/183 |
| 4,335,997 | 6/1982 | Ewing et al. | 416/185 |
| 4,581,300 | 4/1986 | Hoppin et al. | 416/185 |

FOREIGN PATENT DOCUMENTS

| | | |
|---|---|---|
| 307138 | 4/1933 | Italy . |
| 976237 | 11/1964 | United Kingdom . |
| 1515296 | 6/1978 | United Kingdom ............... 416/185 |

OTHER PUBLICATIONS

Howmet Titanium Castings–Howmet Turbine Components Corp.

Primary Examiner—Robert E. Garrett
Assistant Examiner—Therese M. Newholm
Attorney, Agent, or Firm—Terry L. Miller; James W. McFarland

[57] ABSTRACT

A rotor member for a turbomachine includes a first portion formed of comparatively higher creep rupture strength material, and a second portion integrally joined to the first portion and formed of comparatively higher tensile strength material. The rotor defines a bore and is configured such that the operative environment thereof inflicts higher temperatures upon the first portion, and higher centrifugally-induced stresses upon the second portion. In order to improve the operating speed, burst margin, or both, of the rotor a plurality of circumferentially spaced and annularly arrayed cavities are provided within the rotor at the union of the two portions. The portions are intimately united by hot isostatic pressing (HIP) so that the rotor is of a single piece (monolithic) having portions of selected physical properties appropriate to the thermal/physical stresses imposed thereon, and defining voids which reduce the weight and bore stresses thereof.

20 Claims, 2 Drawing Sheets

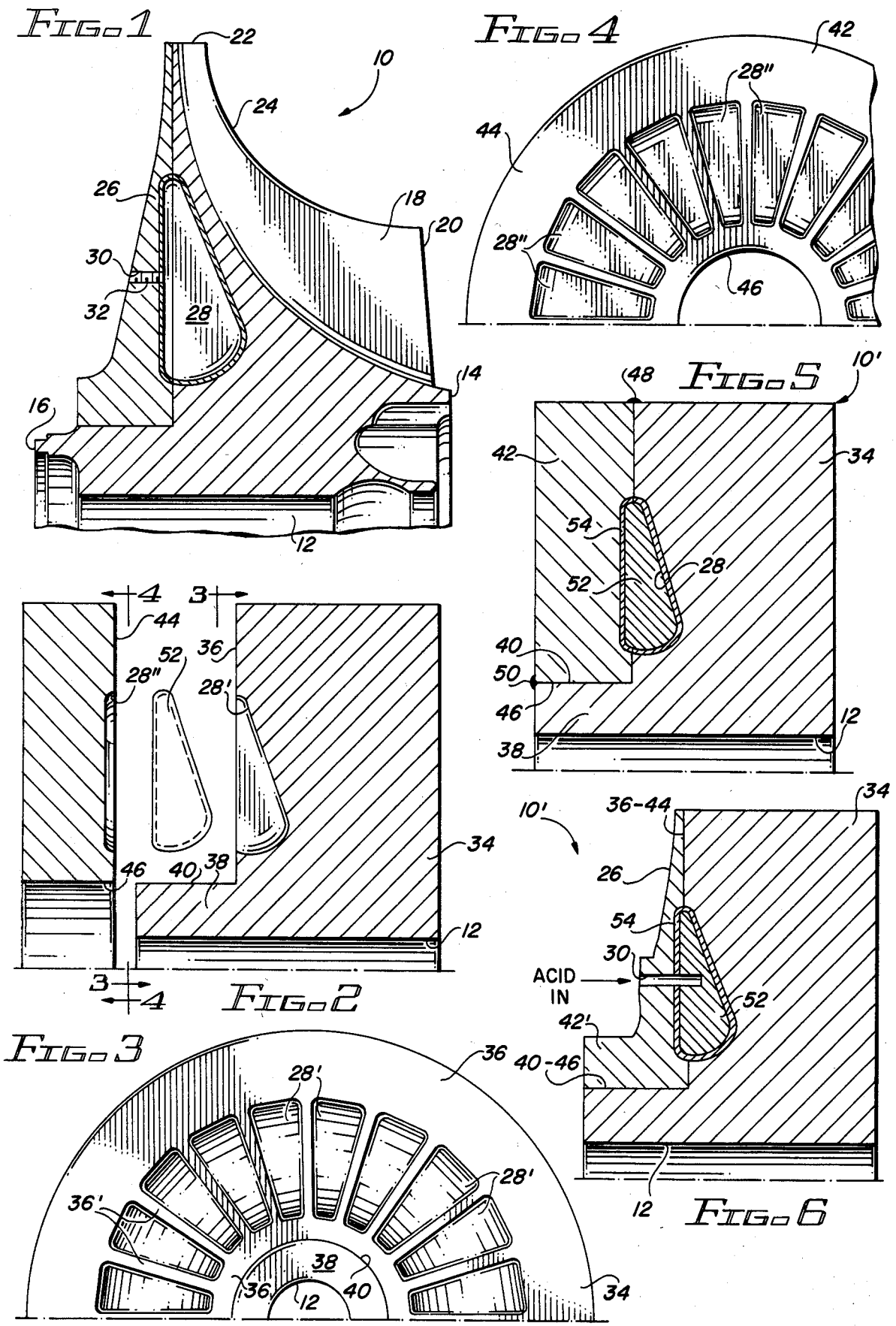

DUAL ALLOY ROTOR

BACKGROUND OF THE INVENTION

The field of the present invention is rotor members for high-speed turbomachinery. More particularly, the present invention relates to a high-speed centrifugal compressor rotor member for a combustion turbine engine.

Those skilled in the arts of design and manufacture of modern high performance aerospace turbine engines know that with any annular rotor member or disc rotating at high speed in the plane of the disc, the higher stresses are encountered at the surface of the central opening or bore. These bore stresses are developed because of the tremendous centrifugal force effective upon the material of the rotor member. Consequently, cracking or rupturing of the rotor member usually will begin at the bore surface. Propagation of such a crack through the material of the rotor member may result in eventual violent fragmentation of the rotor member in operation. Accordingly, a recognized design objective in high performance turbomachinery is to reduce to a minimum the mass of material manifesting centrifugal forces as stresses at the bore of the rotor member.

Yet another problem encountered in the turbomachinery art is that of high temperatures imposed upon rotor members. Usually the highest temperatures occur at the radially outer portions of a rotor member with progressively lower temperatures prevailing radially inwardly toward the bore thereof. Unfortunately, materials which have the comparatively high tensile strength necessary to prevent crack formation at the rotor member bore fail to have the high temperature creep resistance needed for the radially outer portions of the rotor member. To solve this problem, a variety of dual-alloy rotor members have been proposed wherein comparatively high tensile strength material is used at the rotor member bore and material having comparatively higher creep rupture strength is employed at the radially outer portion of the rotor member. Techniques of Hot Isostatic Pressing (HIP) have been used to bond the two or more sections of such a dual-alloy rotor member into a unitary or monolithic whole.

Particularly in the design, manufacture, and use of high performance centrifugal compressors the above-outlined difficulties, and others, combine to frustrate the application of conventional teachings for dual-alloy rotor members. For example, a high performance centrifugal compressor rotor for a combustion turbine engine, such as an advanced aircraft propulsion engine, may have a radially inner inducer portion whereat comparatively lower pressure air is received which exposes the material of the rotor member to only several hundred degrees temperature. On the other hand, the back plate of the centrifugal compressor rotor, which is axially opposite the inducer portion, may have a radially outer portion whereat temperatures of 1000 degrees Fahrenheit, or more, are encountered. All centrifugal compressor rotors rotate within a compressor housing providing, in the interest of aerodynamic efficiency, only a desirably small running clearance between aerodynamic blade members or portions of the rotor member and inner surfaces of the housing. Unfortunately, high temperature creep of the back plate portion of such a rotor member results in sections of the blade members moving axially toward the inducer side of the compressor rotor, as well as radially outwardly. Such plastic deformation of a centrifugal compressor rotor is sometimes referred to as "flowering". Flowering of a rotor eventually results in the running clearance being reduced until running contact and damage to the rotor member and housing results.

SUMMARY OF THE INVENTION

In view of the above, the primary object of the present invention is to provide a unitary high-speed rotor member for turbomachinery wherein material of comparatively higher tensile strength is employed in portions of high centrifugally-induced stress, particularly adjacent a bore of the rotor member; and material having comparatively higher creep rupture strength is employed in portions of higher temperature but lower centrifugally-induced stress, while the overall centrifugally induced stress level of the rotor may be reduced by one or more cavities cooperatively defined by the portions of material having such differing physical properties.

Yet another object of the present invention is to employ the material of comparatively higher creep rupture strength, and the one or more intervening voids, to insulate at least a part of the material of comparatively higher tensile strength (and, therefore, of comparatively lower creep rupture strength at elevated temperature) from the higher temperatures imposed upon the rotor member in operation.

A concomitant object of the present invention is to provide a rotor member for turbomachinery wherein an improved burst margin, increased operating speed capability, or both, is provided.

Still another object of this invention is to provide a turbomachinery rotor with reduced centrifugally-induced bore stress.

Additionally, an object of the present invention is to provide such a turbomachine rotor with a reduced weight in comparison with that minimum weight obtainable by use of conventional teachings.

The present invention provides in accord with one preferred embodiment thereof a dual-alloy rotor member including a disc-like annular first section of comparatively higher tensile strength material defining an axially extending through bore and having an axially disposed inducer face and an oppositely axially disposed radially extending back face, and an axially extending boss portion extending from said back face to define a right circular cylindrical outer surface disposed radially outwardly of said bore; an annular back plate section of said rotor member of material having comparatively higher creep rupture strength at elevated temperatures defining a right ciruclar cylindrical bore matching said cylindrical boss, and an axially disposed radially extending interface surface matching said back face; said back face and said matching interface surface being diffusion bonded, said cylindrical outer boss surface being diffusion bonded within said matching cylindrical bore to unite said first section and said second section into a unitary body.

Further to the above, the invention provides a dual-alloy rotor member of the above described character wherein said first section and said second section cooperatively define one or more voids disposed radially outwardly of said bore within said unitary body.

A method of making a dual-alloy rotor member according to the invention includes the steps of machining matching cooperative recesses into each of the back face of the first annular section and into the matching face of the second annular section, the recesses configured to cooperatively define the one or more cavities of the dual alloy rotor. For each cavity, a precisely shaped support member is provided which nests into each of the matching recesses so that the resulting cavity is substantially filled with the support member. Thereafter, the first section and second section with support member(s) are diffusion bonded into a unitary body by conventional HIP processing techniques. The support members are fabricated of material of sufficient mechanical strength to prevent collapse of the cavities during the HIP process.

Such support members may be removed from the cavities if desired by, for example, making the first and second annular sections of the dual-alloy rotor from respective titanium alloy material having appropriate physical properties, making the support members of steel, providing a protective coating on each support member which is transferable to the inner surface of the respective cavity during HIP processing, uniting the first and second sections and support members and performing the HIP boding process, forming a relatively small passage extending outwardly from each support member to open externally on the dual-alloy rotor member, and employing a solvent or reagent, such as hot nitric acid, to dissolve, liquefy, or leach the support member from each cavity while the transferred protective material substantially prevents etching of the cavity surface.

An advantage of the present invention is that it allows materials having differing physical properties to be used to best advantage in combination. That is, material having comparatively higher tensile strength is employed to define those portions of the dual-alloy rotor whereat tensile stress is predominant. In particular, at the central bore surface of the rotor member the material of comparatively higher tensile strength is best able to withstand the inevitable centrifugally-induced tensile stresses. On the other hand, along the flanks or side surfaces of the rotor member, or at the back face thereof in the case of a centrifugal compressor rotor, the material of comparatively higher creep rupture strength at elevated temperature is best able to endure the higher temperature stresses combined with relatively lower centrifugally-induced stresses.

A further advantage resides in the provision of one or more voids within the unitary dual alloy rotor which desirably reduce its weight and moment of inertia while also reducing centrifugally-induced bore stresses.

The Applicants have happily discovered that by providing a protectant upon the support members which is transferred to the internal surfaces of the associated cavity during HIP diffusion bonding, the later dissolving of the support member does not cause etching of the cavity wall. Such etching could result in stress concentration and crack initiation in the material of the dual alloy rotor. However, the present invention advantageously avoids such undesirable etching of the cavities and unwanted stress concentrations.

Additional objects and advantages of the present invention will appear from a reading of the following detailed description of a single preferred embodiment of the invention taken in conjunction with the following drawing figures.

BRIEF DESCRIPTION OF THE DRAWINGS

FIG. 1 depicts a fragmentary view of a rotor member according to the invention partially in cross section;

FIG. 2 depicts a fragmentary exploded view of two sections of the rotor member depicted in FIG. 1 in cross section, and at an intermediate stage of manufacture;

FIGS. 3 and 4 depict fragmentary axial views of the two component sections shown in FIG. 2, taken along lines 3—3 and 4—4 thereof in the direction indicated;

FIG. 5 fragmentarily and in cross section depicts a rotor member workpiece resulting from uniting the two component sections depicted by FIGS. 2-4, wherein each section defines a portion of the workpiece.

FIGS. 6, 7, 8 and 9 fragmentarily and in cross section depict the rotor member workpiece depicted by FIG. 5 at successively later intermediate manufacturing stages.

DETAILED DESCRIPTION OF THE PREFERRED EMBODIMENT

Figure 7:
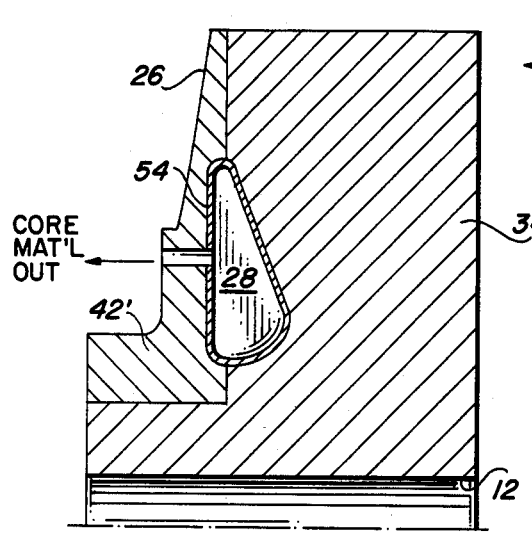

FIG. 1 depicts a disc-like annular rotor member 10 for a combustion turbine engine. The rotor member 10 defines an axially extending central through bore 12, an inducer end 14, and an end 16 axially opposite the inducer end 14. The rotor member 10 also includes an annularly arrayed and circumferentially spaced apart plurality of aerodynamic blade members 18 (only one of which is visible viewing FIG. 1) which extend axially, circumferentially, and radially from a leading edge 20 proximate the inducer end 14 to a radially outer discharge end 22. The aerodynamic blade members 18 define a radially outer tip edge 24. Those skilled in the pertinent art will recognize that the rotor member 10 is configured to function in a centrifugal compressor so that the rotor member would in operation spin within a compressor housing (not shown) closely conforming to the tip edge 24, and providing also an air flow path to the leading edges 20 and from the discharge ends 22. Rotor member 10 also defines an axially disposed, radially extending backface or surface 26. Within the rotor member 10 is defined a plurality of circumferentially spaced apart and annularly arrayed cavities 28 (only one of which is visible viewing FIG. 1). A passage 30 extends outwardly from the cavity 28 to open upon the backplate surface 26 of the rotor member 10. A closure member or plug 32 is received within the passage 30 and permanently closes the latter.

During operation of the rotor member 10 to function as a rotor for a centrifugal compressor stage of a combustion turbine engine, air is received at the leading edges 20 and conveyed between the aerodynamic blade members 18 leftwardly and radially outwardly viewing FIG. 1 to be discharged from the rotor member at the discharge ends 22 of the blade members 18. The air received at leading edges 20 may be at a temperature of several hundred degrees Fahrenheit while the air discharged at discharge ends 22 is at a higher temperature. However, air circulating between the backplate surface 26 and a wall of the combustion turbine engine housing which is not depicted but which is in close conforming relation with the backplate surface 26 and spaced slightly therefrom will, due in part to windage and churning of this air, develop a considerably higher temperature, in some cases as high as 1000 degrees Fahrenheit, or higher. Because the rotor member in operation spins about an axis central of the bore 12 at a very high rate of speed, centrifugal forces effective upon the material of the rotor member are extreme. These centrifugal forces are manifest as stresses within the material of the rotor member 10, and reach their highest value at the inner surface of the bore 12. Consequently, the material of the rotor member 10 which defines the bore 12 must have a comparatively high tensile strength at the temperatures locally experienced in order to endure the high tensile stresses experienced. On the other hand, adjacent the backplate surface 26 thermal stresses upon the rotor 10 are very high because of the high local temperatures, even though centrifugal forces in this area of the rotor result in comparatively lower tensile stresses upon the material of the rotor member.

In order to assure that rotor member 10 will successfully endure both the high centrifugally induced stresses effective at the bore 12 and the high thermal stresses effective in the backplate surface area of the rotor member 10, a first disc-like annular section 34 of material having comparatively higher tensile strength is provided, viewing FIGS. 2-4. The annular section 34 defines the bore 12 and also defines an axially disposed, radially extending, interbonding surface 36. Extending axially from the interbonding surface 36 is an integral annular boss 40 also defined by the section 34. The boss 40 defines an axially extending, radially outwardly disposed, interbonding surface 40. The section 34 is made of titanium alloy material having comparatively higher tensile strength. An appropriate alloy known commonly as Ti 6242 has been used successfully by the Applicants. Section 34 also defines an annularly arrayed circumferentially spaced apart plurality of recesses 28' opening upon the interbonding surface 36. FIGS. 2 and 3 in conjunction illustrate that the recesses 28' are in axial view somewhat sector shaped with rounded apexes. In transverse view, it is seen that the recesses 28' have a rounded semidroplet shape. The radial extent of the recesses 28' is less than that of interbonding surface 36, and the individual recesses 28' are spaced apart so that the surface 36 is radially continuous via web portions 36' thereof.

A second disc-like annular section 42 of titanium alloy material having a comparatively higher creep rupture strength at elevated temperatures is also provided. The section 42 defines a bore 46 providing a radially inwardly disposed and axially extending interbonding surface engageable with the interbonding surface 40 of section 34. Section 42 also defines an axially disposed radially extending interbonding surface 44 which is engageable with the interbonding surface 36 of section 34. Similarly to section 34, the section 42 defines an annularly arrayed and circumferentially spaced apart plurality of recesses 28'' matching in number the recesses 28' of section 34. It will be noted viewing FIGS. 3 and 4 that the recesses 28' and 28'' at the interface interbonding surfaces 36 and 44 have substantially identical peripheral shapes. The recesses 28', 28'' are spaced circumferentially apart and are also spaced radially outwardly of the boss 38 such that the interbonding surfaces 36 and 44 are continuous radially outwardly from the radially inward extend thereof adjacent to the boss 38 and bore 46, respectively, to the radially outward extend thereof at the outer perimeter of the sections 34 and 42. In other words, the circumferentially spaced apart plurality of recesses 28'' of section 42 cooperate to define a radially extending plurality of web surface portions 44' in the section 42 with each of the webs defining a portion of the interbonding surface 44, similarly to web surface portions 36' of section 34. The recesses 28'' are comparatively shallow, but are similar to those recesses 28' of section 34 in that both have a smoothly rounded configuration. When recesses 28',28'' are in axial congruence with one another, they are cooperable to define recesses 28, recalling the description of FIG. 1.

The section 42 is made of titanium alloy material having comparatively higher creep rupture strength at elevated temperatures. The Applicants have successfully employed an alloy of titanium commonly known as Ti 5621 in practicing the invention.

FIG. 5 depicts a rotor member workpiece 10' composed of the section 34 united with section 42 such that the bore 46 of section 42 receives the boss 38 of section 34 and the interbonding surfaces 36 and 44 are in intimate engagement also with one another. In order to facilitate hot isostatic pressing (HIP) of the rotor member workpiece 10', sealing welds 48 and 50 are provided at the outer extents of the interbonding surfaces 36-44 and 40-46, respectively. Additionally, in order to prevent collapse of the cavities 28 when the rotor member workpiece 10' is exposed to HIP processing, each of the cavities 28 is provided with a shape-retaining support member 52. The support members 52 are fabricated from steel and are closely conforming to each of the recesses 28, 28' such that the cavity 28 formed by axial congruence of these recesses when the sections 34 and 42 are united as shown in FIG. 5 is substantially filled, desirably with no ullage volume. A segregation coating is provided upon the steel support members 52 so that atomic migration or diffusion of elements from the steel support members 52 into the titanium alloys of the sections 34 and 42 does not occur during HIP processing. During such HIP processing, the Applicants believe that the high temperatures and pressures effective upon the rotor member workpiece 10' result in the segregation coating 54 being transferred to the inner surfaces of the cavities 28 within the rotor member workpiece 10'. Such HIP processing also results in diffusion bonding at the interface surfaces 36-44 and 40-46, such that these interface surfaces cease to exist following the HIP processing, and the sections 34,42 become portions of a unitary body. However, in order to make clear the continued existence of the portions 34-42 having distinct physical properties, the bond line at former surfaces 36,44, and 40,46 will hereinafter be referenced with the hyphenated characters, "36-44", and "40-46".

Figure 8:
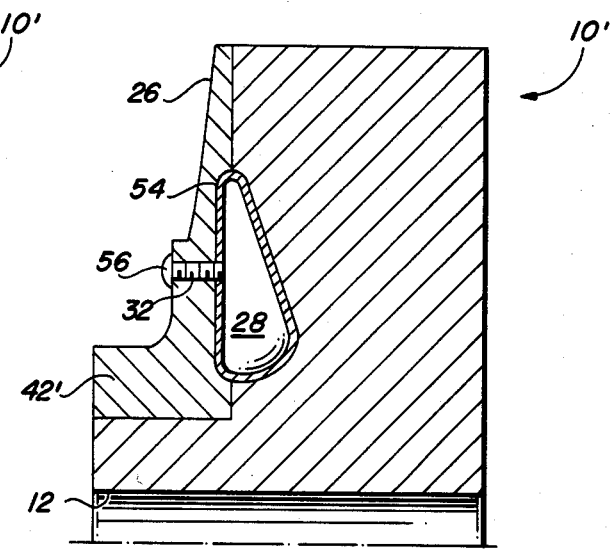
Figure 9:
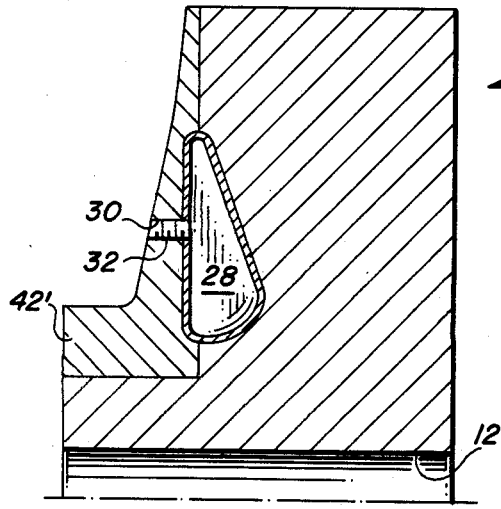

FIGS. 6-9 in numerical order depict rotor member workpieces 10' at successive intermediate stages of manufacture subsequent to diffusion bonding of the sections 34 and 42 into a unitary body. Viewing FIG. 6, it will be seen that the rotor member workpiece 10' is machined at the portion 42 thereof to define the backplate surface 26 thereof. Additionally, a plurality of passages 30 (only one of which is depicted viewing FIG. 6) are formed each extending outwardly of a respective one of the cavities 28 to open upon the backplate surface 26 of the rotor member workpiece 10. These passages 30 respectively extend through the segregation coating 54 and into the steel support members 52 within each of the cavities 28. In order to remove the support members 52 from the cavities 28, hot nitric acid is injected via the passages 30 to dissolve or liquefy the support members viewing FIG. 6. As FIG. 7 shows, the support members 52 are dissolved completely from the cavities 28 and are removed as liquified or dissolved material via the passages 30, leaving behind the segregation coatings 54 as an internal coating on the cavities 28. FIG. 8 depicts that subsequent to the removal of the support members 52 from each of the cavities 28 via the passages 30, each of the latter are closed by a respective plug member 32 pressed into the passage. Each one of the plug members 32 includes a head portion 56 in engagement with the backplate surface 26 of the rotor member workpiece 10. FIG. 9 depicts the rotor member workpiece 10 at a later intermediate stage of manufacture whereat the haad portions 56 of closure members 32 have been machined off to leave substantially all of the backplate surface 26 in a near-final form.

Figure 10:
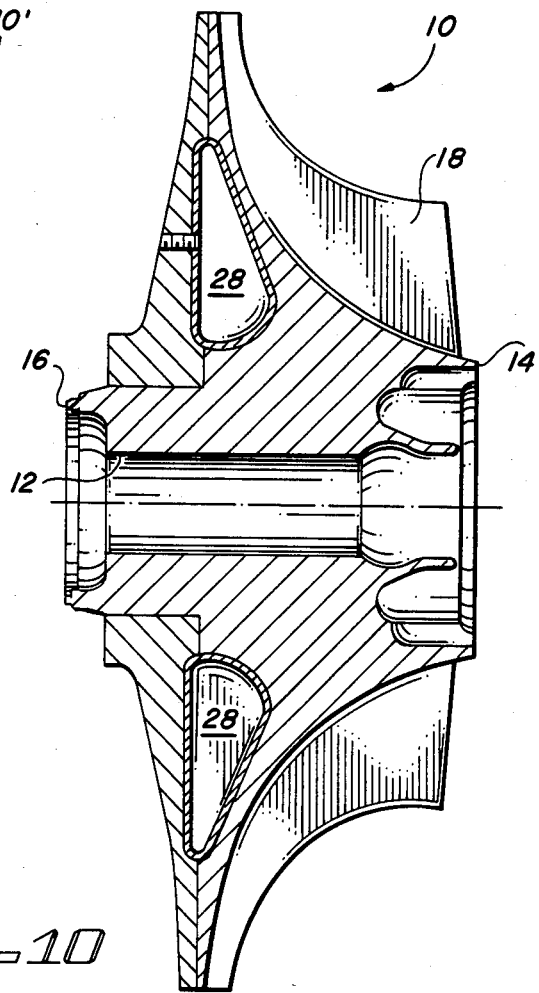
FIG. 10 depicts an axial view of a complete rotor member according to the invention, partially in cross section similarly to FIG. 1.

FIG. 10 depicts a completed rotor member 10 which has had the portion 34 thereof machined to define the aerodynamic blade members 18 thereon as well as to provide coupling and balance details at the inducer end 14 thereof. Also at the end 16 of the completed rotor member 10 coupling and balance details also have been provided.

An actual reduction to practice of the invention herein depicted and described has been made by the Applicants. In this actual reduction to practice, a centrifugal compressor rotor substantially as depicted herein was fabricated from the titanium alloy materials identified and would have had a weight of 106 pounds if it had been made without cavities 28 therein. However, the compressor rotor member was provided with 20 cavities substantially as depicted to reduce the overall weight of the rotor member to 86 pounds. This reduction in weight of the rotor member had the beneficial effect of reducing its moment of inertia as well as increasing its burst speed significantly. Testing of this rotor member at design speeds and temperatures established that substantially no flowering of the rotor member occurred after operation thereof as expected in a combustion turbine engine.

It should be noted that provision of a separate backplate portion of the compressor rotor member by means of the above-described process can provide increased resistance to high temperature creep experienced by compressor impellers as a result of the high temperatures to which the backplate portions are typically subjected during operation, even without the utilization of lightening cavities 28 as herein depicted and described. It should also be noted that providing cavities 28 in a rotor member as described above will provide substantially increased burst speed and lowered bore stresses even though the dual alloy structure herein depicted is not utilized.

Having described our invention by reference to a single preferred embodiment thereof and with sufficient detail to enable one ordinarily skilled in the pertinent art to make and use the invention, it is our wish to protect our invention according to the following claims. Although the invention has been depicted and described by reference to a single particularly preferred embodiment thereof, no limitation is implied upon the invention by such reference, and no such limitation is to be inferred. The invention is intended to be limited only by the spirit and scope of the appended claims, which also provide additional definition of the invention.

We claim:

1. A dual-alloy rotor member comprising a disc-like annular first portion of first comparatively higher tensile strength material defining an axially extending central bore, said first portion defining an axially disposed radially extending first interbonding surface, a boss extending axially from said first surface and circumscribing said central bore to provide a radially outwardly disposed second interbonding surface; a disc-like annular second portion of second material having comparatively higher creep rupture strength at elevated temperatures, said second portion defining a central through passage of size larger than said central bore and matching said second interbonding surface to provide a radially inwardly disposed third interbonding surface, said second portion further defining an axially disposed radially extending fourth interbonding surface matching said first interbonding surface; said second portion being received at said central through passage thereof upon said boss of said first portion to engage said first interbonding surface with said fourth interbonding surface, and said second interbonding surface with said third interbonding surface; said engaged interbonding surfaces diffusion bonding to unite said portions into a unitary body, wherein said first portion and said second portion cooperatively define a cavity within said rotor member, and wherein a passage extends from said cavity to open outwardly upon said rotor member.

2. The invention of claim 1 wherein said second portion defines said passage.

3. A method of making a dual-alloy rotor member comprising the steps of:

forming first material having a comparatively higher tensile strength into a disc-like annular first part defining a central bore, forming an axially disposed radially extending annular first interbonding surface upon said first part radially outwardly of said central bore, forming said first part to provide a boss extending axially from said first surface and circumscribing said bore, providing on said boss a radially outwardly disposed second interbonding surface, forming in said first interbonding surface of said first part a first recess;

forming second material having a comparatively higher creep rupture strength at elevated temperatures into a disc-like annular second part defining a central through passage larger than said central bore, forming an axially disposed radially extending annular third interbonding surface upon said second part which is engageable with said first interbonding surface, forming within said central through passage a fourth radially inwardly disposed interbonding surface which is engageable with said second interbonding surface, forming in said third interbonding surface of said second part a second recess matching axially congruently with said first recess;

providing a support member conforming with both said first recess and said second recess;

uniting said first part and said second part to engage said first interbonding surface with said third interbonding surface and said second interbonding surface with said fourth interbonding surface and aligning said first recess with said second recess in matched axial congruence to cooperatively define a cavity;

capturing said support member within said cavity with substantially no ullage space;

subjecting said united first part, second part, and support member to hot isostatic pressure diffusion bonding (HIP);

employing said HIP bonding to diffusion bond said engaged interbonding surfaces to unite said parts into a unitary body; and removing said support member from said cavity.

4. The method of claim 3 including the further step of providing a segregation coating upon said support member.

5. The method of claim 4 further including providing said segregation coating comprising tungsten.

6. The method of claim 5 further including the step of fabricating said support member of steel.

7. The method of claim 6 wherein said step of removing said support member includes the steps of providing a passage extending outwardly of said cavity to open upon said rotor member, introducing a selective solvent or reagent into said passage to respectively dissolve or liquefy only said support member, and removing said dissolved or liquefied support member from said cavity via said passage.

8. The method of claim 7 including further the step of utilizing hot nitric acid as said solvent or reagent.

9. The method of claim 3 further including the step of employing as said first material titanium alloy, Ti 6242.

10. The method of claim 3 further including the step of employing as said second material titanium alloy, Ti 5621.

11. A dual-alloy rotor member made according to the method of claim 3.

12. A dual-alloy centrifugal compressor rotor member of unitary construction having a plurality of closed cavities therein, said rotor member comprising:
a disc-like annular first portion defining a central through bore, an axial inducer end and a first axially disposed radially extending annular bond interface spaced from said axial inducer end, a boss part of said first portion extending axially from said first bond interface and circumscribing said central through bore to define a second annular bond interface disposed radially outwardly and extending axially, a plurality of radially outwardly extending integral aerodynamic blade members spaced circumferentially apart and extending axially and circumferentially from proximate said axial inducer end to terminate in a radially outer discharge end thereof, said first portion comprising material having comparatively higher tensile strength;
a disc-like annular second portion received upon and circumscribing said boss part of said first portion; said second portion defining an axially disposed radially extending third bond interface diffusion bonding with said first bond interface, a radially inwardly disposed axially extending fourth bond interface diffusion bonding with said second bond interface, said second portion comprising material having comparatively higher creep rupture strength at elevated temperatures;
said first portion and said second portion cooperating to define a plurality of annularly arrayed circumferentially spaced apart, closed cavities spaced radially outwardly of said central through bore and within said rotor member, each one of said plurality of cavities being substantially similar and residing in part within said first portion and in part within said second portion so that said first bond interface and said second bond interface cooperatively define a transverse plane transecting each of said cavities, a respective plurality of passages extending axially outwardly each from a respective one of said plurality of cavities through said second portion to open outwardly upon said rotor member, each one of said plurality of passages being substantially similar and significantly smaller in axial cross section than said respective cavity; and means for closing each of said plurality of passages.

13. The invention of claim 12 wherein said first portion comprises titanium alloy, Ti 6242.

14. The invention of claim 12 wherein said second portion comprises titanium alloy, Ti 5621.

15. A unitary rotor member for a turbomachine comprising a disc-like annular first portion defining a through bore, a boss part of said first portion extending axially therefrom to in part define said through bore, said boss part defining an axially extending radially outwardly disposed first bond interface, said first portion also defining a radially extending second bond interface disposed axially in like with extension of said boss part; a disc-like annular second portion axially stacked with said first portion and defining a through passage providing a radially inwardly disposed third bond interface HIP interbonding with said first bond interface, and an axially disposed radially extending fourth bond interface HIP interbonding with said second bond interface, said first portion and said second portion cooperating to define and bound a closed cavity transected by a plane defined by said second and said fourth bond interfaces.

16. The invention of claim 15 wherein said first portion and said second portion cooperate to define a plurality of annularly arrayed and circumferentially spaced apart closed cavities disposed radially outwardly of both said through bore and said boss part, and each of said plurality of cavities is transected by said plane.

17. The invention of claim 15 wherein said first portion is entirely of material having comparatively higher tensile strength.

18. The invention of claim 15 wherein said second portion is entirely of material having comparatively higher creep rupture strength at elevated temperatures.

19. The invention of claim 17 wherein said material is titanium alloy, Ti 6242.

20. The invention of claim 18 wherein said material is titanium alloy, Ti 5621.

* * * * *